Patented Mar. 2, 1943

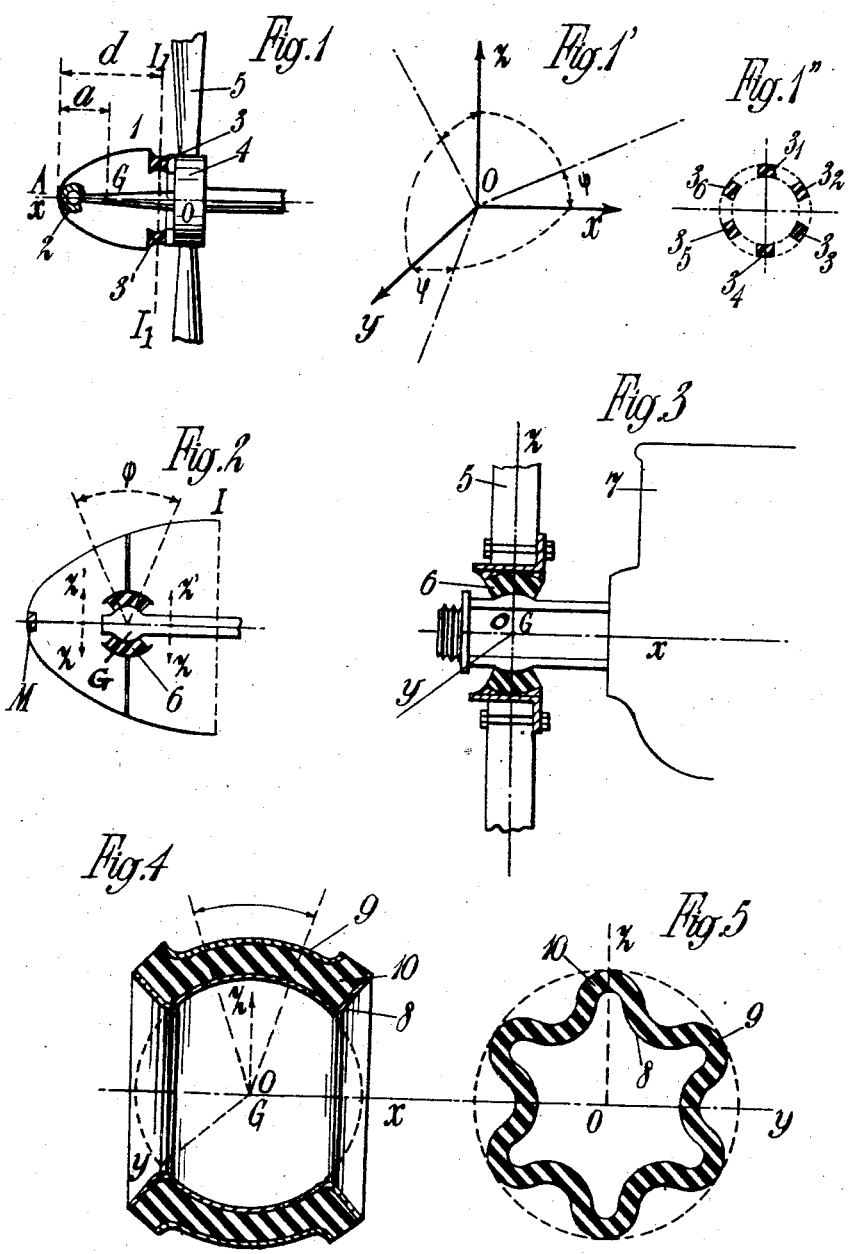

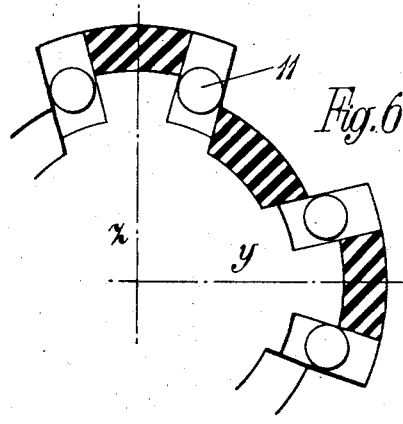
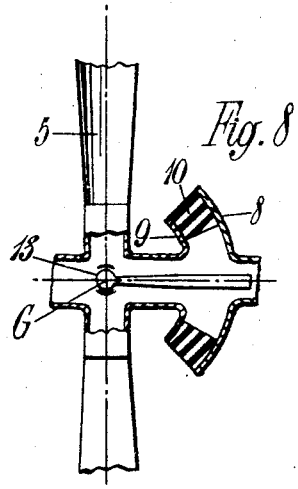
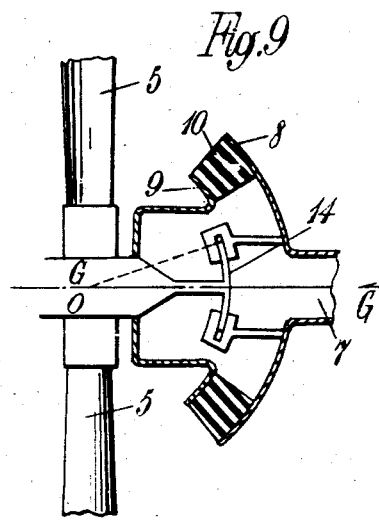
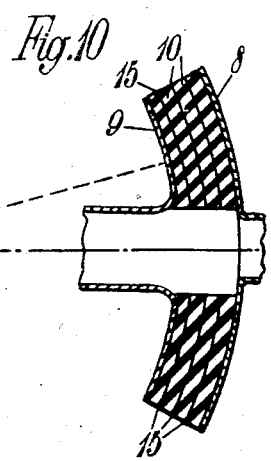
Maurice F. A. Julien
Yves A. Rocard
Inventors

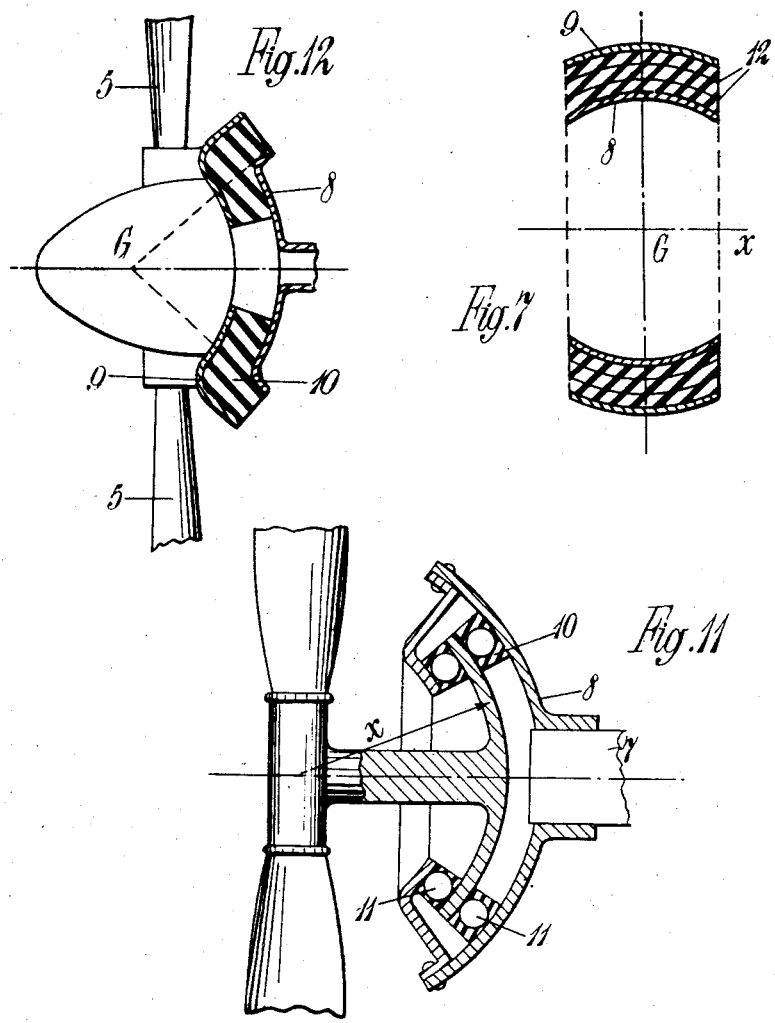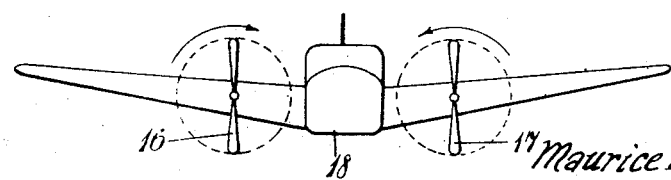

2,312,822

UNITED STATES PATENT OFFICE 2,312,822

RESILIENT SUSPENSION, PARTICULARLY FOR BODIES DRIVEN WITH A ROTARY MOTION

Maurice François Alexandre Julien and Yves André Rocard, Paris, France; vested in the Alien Property Custodian Application July 13, 1938, Serial No. 219,102
In France July 15, 1937

1 Claim. (Cl. 170—177)

It is known to suspend resiliently objects capable of vibrating, where it is necessary to avoid transmission of the vibrations. In order that the suspensions shall be effective they must satisfy certain conditions which, in many engines for example, have the object of making the natural frequencies of the body oscillating on its supports fall outside the range of frequencies of the phenomena capable of starting the vibrations.

The present invention relates, however to the suspension of entirely rotating bodies such as the spinners of airplane propellers, the propellers themselves or the like where it is a question of fixing them on a shaft which rotates them, and it consists in obtaining an angular insulation of the rotating body with respect to the periodic angular impulses, by means such that the rotating body retains likewise the possibility of being directed at the demand of gyroscopic effects, in the case of a change of direction, this for the purpose of avoiding the vibrations which can arise from a dynamic want of balance, even if the static equilibrium is fully obtained.

Consequently, the invention provides means for the rotating body to remain pivoted at a point of the shaft which drives it, this point being advantageously but not necessarily the centre of gravity of the rotating body.

It is not necessary, however, for the pivoting to be obtained by rigid connecting members. If the resilient suspension members serving to fulfil the other objects of the invention are also used for the centering and the pivoting of the rotating body, and if this centering takes place at the centre of gravity of the rotating body of mass $m$, at the angular speed $\omega$, for a radial displacement $r$ of this point, it gives rise to the centrifugal force $m\omega^2 r$.

In order to be able to consider that the body remains pivoted the radial resilient readjustment $Kr$ produced must be greater than $m\omega^2 r$. Therefore the radial rigidity of the means employed must be greater than $m\omega_1^2$ where $\omega_1$ is the greatest possible speed of use. This is the first condition or pivoting condition which characterises the suspension according to the invention. It expresses that the radial rigidity must be above a certain minimum.

In order better to understand the other features of the invention a particular application will be described in detailed manner.

In the accompanying drawings:

Fig. 1 is a transverse section of a propeller spinner suspended resiliently with respect to the propeller, the latter being shown in elevation.

Figure 1' is a diagrammatic view.

Figure 1" is a diagrammatic sectional view showing the resilient supports of Figure 1.

Figure 2 shows in section another arrangement for suspending a propeller spinner.

Figure 3 is a sectional view of a resiliently suspended propeller, the arrangement being of the general type shown in Figure 2.

Figure 4 is a transverse sectional view of an improved form of coupling member.

Figure 5 is a transverse sectional view of another form of improved coupling member.

Figure 6 is a sectional view of a coupling arrangement involving the use of balls or wedges.

Figure 7 is sectional view of a ball joint including a lamination with metal plates.

Figures 8 to 12 inclusive show sectional views of various modifications of the resilient supports mounted in a lateral spherical zone, and Figure 13 is a front elevational view of a two-engined airplane with the propellers mounted to operate in opposite directions.

Referring now more particularly to the accompanying drawings, particularly Figure 1, attention is called to the fact that tests have shown that the spinner member 1 in spite of its lightness plays a part in the rotating inertia created by the propeller on account of its large forward overhang and that its presence can cause dangerous vibrations of the assembly. The invention here consists in suspending it resiliently in relation to the propeller while taking the desired precautions for this suspension to be effective for the vibratory insulation in the rotation itself.

In this figure are seen at 1 the spinner, at 2 a ball and socket joint which fixes its point A on the axis AG, which is the axis of rotation of the propeller 5. G is the centre of gravity of the spinner alone in the position of rest in the absence of vibrations, 4 is the hub of the propeller and 3 and 3' are resilient supports, for example of adhering rubber.

Let $a$ and $d$, the distances marked in Figure 1, be the moment of inertia of the spinner rotating about the axis AG or OX; $I_1$ its moment of inertia about any axis passing through G and perpendicular to AG; $\phi$ and $\psi$ represent the angles characterising the oscillation of the spinner about the axes Oz and Oy (Figure 1'). The equations which govern the small vibratory movements of the spinner (in the absence of external disturbance) are:

$$(I_1+ma^2)\frac{d^2\phi}{dt^2}-I_0\omega\frac{d\psi}{dt}+(K_1d^2-ma^2\omega^2)\phi=0$$

$$(I_1+ma^2)\frac{d^2\psi}{dt^2}+I_0\omega\frac{d\phi}{dt}+(K_1d^2-ma^2\omega^2)\psi=0$$

$K_1$ is the radial rigidity of the assembly of resilient supports 3 and 3'; these equations essentially assume the body to be pivoted at A and they allow the natural pulsations $\omega_1$ and $\omega_2$ of the spinner to be deduced. These natural pulsations, on account of the gyroscopic expressions which are:

$$-I_0\omega\frac{d\psi}{dt}$$

in the first equation, and $$+I_0\omega\frac{d\phi}{dt}$$

in the second equation, depend on the speed of rotation, while in the problems of suspension treated hitherto that had never existed.

For $\omega_1$ and $\omega_2$ it is found that:

$$\frac{\omega_1}{\omega}=\frac{I_0}{2(I_1+ma^2)}\left[1+\sqrt{1+\frac{4\left(\frac{Kd^2}{\omega^2}-ma^2\right)(I_1+ma^2)}{I_0^2}}\right]$$

$$\frac{\omega_2}{\omega}=\frac{I_0}{2(I_1+ma^2)}$$

$$\left[1+\sqrt{1+\frac{4\left(\frac{Kd^2}{\omega^2}-ma^2\right)(I_1+ma^2)}{I_0^2}}-1\right]$$

Whenever $\omega_1$ and $\omega_2$ are different from $\omega$, there is no resonance to fear which maintains the vibrations. The invention therefore consists in determining the geometrical arrangement of the suspension and likewise the rigidity of $K_1$ in such a way that no resonance takes place in the range of values of $\omega$ of the region of use of the engine.

By putting $\omega=\omega_1$ the condition is found that:

$$\omega^2=\frac{Kd^2}{I_1+2ma^2+I_0}$$

which defines a certain low pulsation resonance, say $\omega'$. By putting $\omega=\omega_2$ it is found that:

$$\omega^2=\frac{Kd^2}{I_1+2ma^2-I_0}$$

which defines a high resonance, say $\omega''$.

In addition, the stability of the mounting under the action of centrifugal force necessitates that:

$$\frac{Kd^2}{ma^2}>\omega^2$$

even at the highest speeds of rotation.

If then $\omega_r$ is the lowest angular speed of the propeller and $\omega_m$ is the greatest angular speed of the propeller, the invention then consists in obtaining a suspension with $K_1$ and $d$ following the solutions to be chosen.

In the first we have:

$$\begin{cases}\frac{Kd^2}{I_1+2ma^2+I_0}<\omega^2r & (1)\\ \frac{Kd^2}{I_1+2ma^2-I_0}>\omega^2m & (2)\\ \frac{Kd^2}{ma^2}>\omega^2m & (3)\end{cases}$$

In the second we have:

$$\frac{Kd^2}{I_1+2ma^2+I_0}>\omega^2m$$

In the third we have:

$$\frac{Kd^2}{I_1+2ma^2-I_0}<\omega^2r$$

$$\frac{Kd^2}{ma^2}>\omega^2m$$

The third solution is almost impossible to obtain in view of the considerable difference in practice which exists between $\omega_r$ and $\omega_m$.

The second solution leads to the necessity of providing the resilient supports with very great stiffness and consequently also a very rigid, heavy etc. construction of the spinner so that it is not of much interest from the point of view of cost.

The third solution is, however, quite in the spirit of the invention and allows the maximum benefit to be obtained from the use of resilient supports.

It is to be noted that in practice it is easy to make $I_1$ and $I_0$ of the same order of magnitude. Under these conditions it is easy to satisfy the three relations (1) (2) and (3) of the first solution by making $ma^2$ small or zero (pivoting point near the centre of gravity) in which case the two conditions (2) and (3) are satisfied together and it is then sufficient to choose the stiffness K small enough for the condition (1) to be fulfilled.

Under these conditions in its preferred form the invention is characterised by the following three main features:

(a) The rotating body is pivoted near its centre of gravity;

(b) The geometrical design of the spinner is such that the moments of inertia $I_1$, $I_0$ are almost equal, it being possible to satisfy this condition particularly by means of carefully placed counter-weights;

(c) The rigidity of the resilient supports is chosen sufficiently low for the lowest of the natural frequencies of the rotating system to fall below the practical slow running of the driving shaft.

The pivoting provided at A or at G can be obtained by any known means, more particularly ball and socket joints. The resilient supports 3 are likewise of any type.

They will be arranged, for example, on Figure 1'' at $3_1$, $3_2 \ldots 3_6$.

The foregoing analysis shows that the conditions to be fulfilled are easier to be obtained the nearer the pivoting takes place to the centre of gravity. For bodies of large rotating inertia such as aeroplane propellers this imposes in an almost absolute manner the pivoting at the centre of gravity itself. The invention thus aims at improved means consisting in the use of single members for ensuring at the same time the pivoting and the elasticity permitting the angular displacements of the rotating body.

Figure 2 shows an arrangement in which a propeller spinner I is suspended at its centre of gravity G, the latter adjusted by means of the counterweight M, owing to a single ball and socket joint 6 consisting of two adhering rubbers between two spherical frames. Thus the angular movements along $\psi$ in Figure 2 are very easy and rectilinear movements along $z$, $z'$ become very difficult on account of the high resistance to compression of the rubber mounting employed.

Figure 3 shows a similar arrangement but applied to a propeller 5 the centre of gravity of which as at G, driven by an engine 7, with the same ball and socket joint of adhering rubber 6 as in Figure 2. This ball and socket joint working along the linear displacements of G parallel to Oy, Oz is subjected to the condition already mentioned of a stiffness capable of opposing the centrifugal force on the entire propeller at all speeds. According to the angular displacements $\phi$ and $\psi$ it is subjected to conditions expressed by the Formulae 1 and 2 given above.

It will be expedient to choose the value of the resilient readjustment so that the natural frequency of angular oscillation along these two directions is sufficiently low to fulfill the "plug" condition i. e. filter out the undesirable with lowest frequency which can excite or cause the change of plane of the propeller, that for example due to the passage of the blades opposite an obstacle such as a leading edge of the wing, a mast, etc., the said frequency being consequently equal to the product of the minimum number of turns of the propeller at slow speeds by the number of blades. However, if the rotation itself which drives the propeller about the axis Ox is considered, this rotation comprises pulsations due more particularly to the irregularity of the driving torque, in which case it must be required that the ball and socket point of rubber considered as an elastic driving coupling between the engine and the propeller also has "plug" or properties arresting the vibrations which necessitate it satisfying the conditions mentioned.

It will be noted again that the propeller, if it has two blades, instead of having a simple moment of inertia $I_1$ will have two different moments of inertia $I'_1$ and $I''_1$ about axes such as Oy, Oz rotating with the propeller, which in the case of such a propeller complicates the analysis given in the case of propeller spinners. One of these moments $I'_1$ will be substantially equal to $I_0$ and the other $I''_1$ will be negligible in view of the first. The condition (I) for a two blade propeller will then become substantially:

$K_1 d^2$ represents the angular rigidity of the resilient ball and socket joint and will then be appreciably be more difficult to satisfy especially if the condition of stability is taken into consideration:

$$\frac{K_1 d^2}{I_0} < \omega^2 r$$

$K_1$ is this time the rigidity of the ball and socket joint for a linear displacement of G along Oy, Oz.

For all these reasons the three-blade propellers for which:

$$\frac{K_1}{m} > \omega^2 m$$

must be clearly preferred from the point of view of vibratory insulation.

The foregoing discussion shows that the coupling members concentrated in a spherical or ball and socket joint according to the invention must satisfy very different conditions of rigidity for the linear displacements Oy, Oz without mentioning the displacements Ox, and for the angular displacements about Oy, Oz with respect to the rotation displacements about Ox. That is why the invention provides a whole series of means in order to proportion these rigidities in an independent manner. Figures 4 to 12 show examples of embodiment of the invention.

Let $C_1$ be the angular rigidity for a rotation such as $\zeta$ about Oy or Oz and let $C_0$ be the angular rigidity for the rotation about the driving axis Ox, Figure 4 shows an arrangement seen in transverse section along the plane zOx (see also Fig. 11) where as a result of the flanged shapes given to the metal frames 8, 9, the cross-hatched mass 10 representing the rubber $C_1$ is rendered clearly greater than $C_0$.

Figure 5 shows, however, an arrangement in section along the plane yOz perpendicular to the axis of rotation where $C_0$ is clearly greater than $C_1$, the mass of rubber having the form of a jagged polar curve.

Figure 6 shows an arrangement similar to that of Figure 5 where the use of balls 11 or wedges gives an infinite stiffness to the drive about Ox ($C_0$ infinite).

Figure 7 shows an arrangement in section along zOx where a lamination with metal plates 12 makes the spherical or ball and socket joint very rigid for linear displacements along Oz, Oy without changing the values of $C_0$ and $C_1$.

In all these arrangements all rigid connection between the hub and the blades of propellers is rendered impossible. The invention thus provides modifications of application which allow the hub to be maintained available for various mechanisms, such as that of variable pitch propellers for example.

Figure 8 shows a first arrangement which resembles the embodiment of Figure 1 with a ball and socket joint 13 at G and the resilient supports mounted in a lateral spherical zone.

Figure 9 shows an embodiment deduced from Figure 8 by the replacement of the ball and socket joint by a lateral spherical guide 14 provided with similar geometrical properties.

Figures 10 and 11 show much simpler means for obtaining this guiding, either in an approximate manner (Figure 10) by stiffening the resilient rubber support by means of a lamination 15, or in a strict manner (Figure 11) by imbedding in the rubber, balls 11 which come into contact with the frames and more particularly prevent compression of the rubber 10 under the action of the precession of the propeller.

The arrangement described, Figures 4, 5 and 6, for proportioning the relative value of the stiffness $C_0$, $C_1$, etc. is also applied naturally to the case of devices having decentred ball and socket joints as in Figures 8, 9, 10 and 11.

Figure 12 shows an arrangement by way of example the operation of which need not be explained again: it is the application of the device shown in Figure 4 to a decentred ball and socket joint.

A particular application of the invention relates to multi-engine aeroplanes and more particularly aeroplanes having two and four engines.

If, for example, a two-engined aeroplane is considered the propellers of which are mounted in accordance with the invention, it results therefrom that during turning, the plane of the propellers becomes inclined under the action of the gyroscopic forces and consequently the direction of traction for each propeller rises or falls according to the direction of rotation of the propeller. It is desirable to profit from this effect by banking the aeroplane during the turn to avoid the side slip due to the centrifugal force. It is sufficient to give the two propellers 16 and 17 on both sides of the fuselage 18 an opposite direction of rotation, which is that of the arrows on Figure 13 for the aeroplane seen from the front. This allows less warping to be required during a turn or else the said warping can be entirely suppressed.

We claim:

Driving means for an aircraft propeller comprising a drive shaft, spaced concave and convex spherical surfaces respectively fixed in relation to the shaft and propeller and located laterally with respect to the propeller, said surfaces having a common centre of curvature coincident or substantially coincident with the centre of gravity of the propeller, resilient material between and connected to said surfaces whereby the propeller can move angularly about said centre against the action of the resilient material and metal plates embedded in the resilient material and of spherical curvature concentric with said spherical surfaces to limit compression of the resilient material in all directions radially with respect to said spherical surfaces.

MAURICE FRANÇOIS ALEXANDRE JULIEN.
YVES ANDRÉ ROCARD.